United States Patent [19]

Ruta

[11] Patent Number: 4,839,770
[45] Date of Patent: Jun. 13, 1989

[54] CONTROL CIRCUIT WITH VALIDITY-DETERMINING ARRANGEMENT

[75] Inventor: Joseph W. Ruta, Arlington Heights, Ill.

[73] Assignee: S&C Electric Company, Chicago, Ill.

[21] Appl. No.: 147,828

[22] Filed: Jan. 25, 1988

[51] Int. Cl.⁴ .................... H02H 3/05; H01F 40/06
[52] U.S. Cl. ........................... 361/93; 361/87; 361/94; 340/646; 340/664; 323/358; 324/127
[58] Field of Search .................. 361/35, 63, 93, 94, 361/110, 97, 44, 45, 86, 87, 36, 109; 323/358; 324/127; 307/282, 314, 413; 340/646, 660, 664

[56] References Cited

U.S. PATENT DOCUMENTS

| | | | |
|---|---|---|---|
| 3,343,084 | 9/1967 | Gambale et al. | 34/103 R |
| 3,848,159 | 11/1974 | Nye, Jr. et al. | 361/45 |
| 4,002,950 | 1/1977 | Dickerson | 317/16 |
| 4,104,691 | 8/1978 | Shimp et al. | 361/96 |
| 4,156,262 | 5/1979 | Eller et al. | 361/28 |
| 4,204,237 | 5/1980 | Zocholl | 361/36 |
| 4,280,162 | 7/1981 | Tanka et al. | 361/45 |
| 4,297,741 | 10/1981 | Howell | 361/93 |
| 4,434,415 | 2/1984 | Jarosz et al. | 337/186 |
| 4,466,041 | 8/1984 | Witulski et al. | 361/93 |
| 4,532,571 | 7/1985 | Satou | 361/93 |
| 4,567,540 | 1/1986 | Ruta | 361/93 |
| 4,571,658 | 2/1986 | Ruta | 361/95 |
| 4,605,982 | 8/1986 | Harner et al. | 361/94 |
| 4,642,724 | 2/1987 | Ruta | 61/96 |
| 4,685,024 | 8/1987 | Martellock et al. | 361/93 |

OTHER PUBLICATIONS

"Digital EHV Current Transducer", by L. B. Berkebile, 1980, IEEE, 80 SM 647-8.

Primary Examiner—A. D. Pellinen
Assistant Examiner—David Osborn
Attorney, Agent, or Firm—James V. Lapacek

[57] ABSTRACT

An arrangement is provided for checking the validity of a sensed-current signal from a current-sensing device. The sensed-current signal represents the current in a line. An associated control circuit utilizes the sensed-current signal to indicate or predict the presence of undesired overcurrent conditions. When such conditions may be present, the sensed-current signal is checked to determine if the sensed-current signal is valid; i.e., whether the sensed-current signal accurately represents the current in the line. If the sensed-current signal is invalid, no trip signal is generated to interrupt the current. If the sensed-current signal is valid, the control circuit generates a trip signal to control operation of a circuit-interrupting device. In a particular arrangement, the load on the current-sensing device is changed to determine if the sensed-current signal is valid. If the sensed-current signal is valid, the level of the sensed-current signal remains in a valid range and the overcurrent-detection circuit issues the trip signal. If the sensed-current signal is invalid, the level of the sensed-current signal changes. In response, the control circuit does not issue the trip signal and is reset to an initialized mode to monitor for a valid overcurrent condition in response to the sensed-current signal. In a specific arrangement, the current-sensing device is an iron-core transformer which saturates at high current levels. Thus, if the transformer is saturated, the changing of the load on the transformer causes the level of the sensed-current signal to change and the trip signal is not issued.

11 Claims, 3 Drawing Sheets

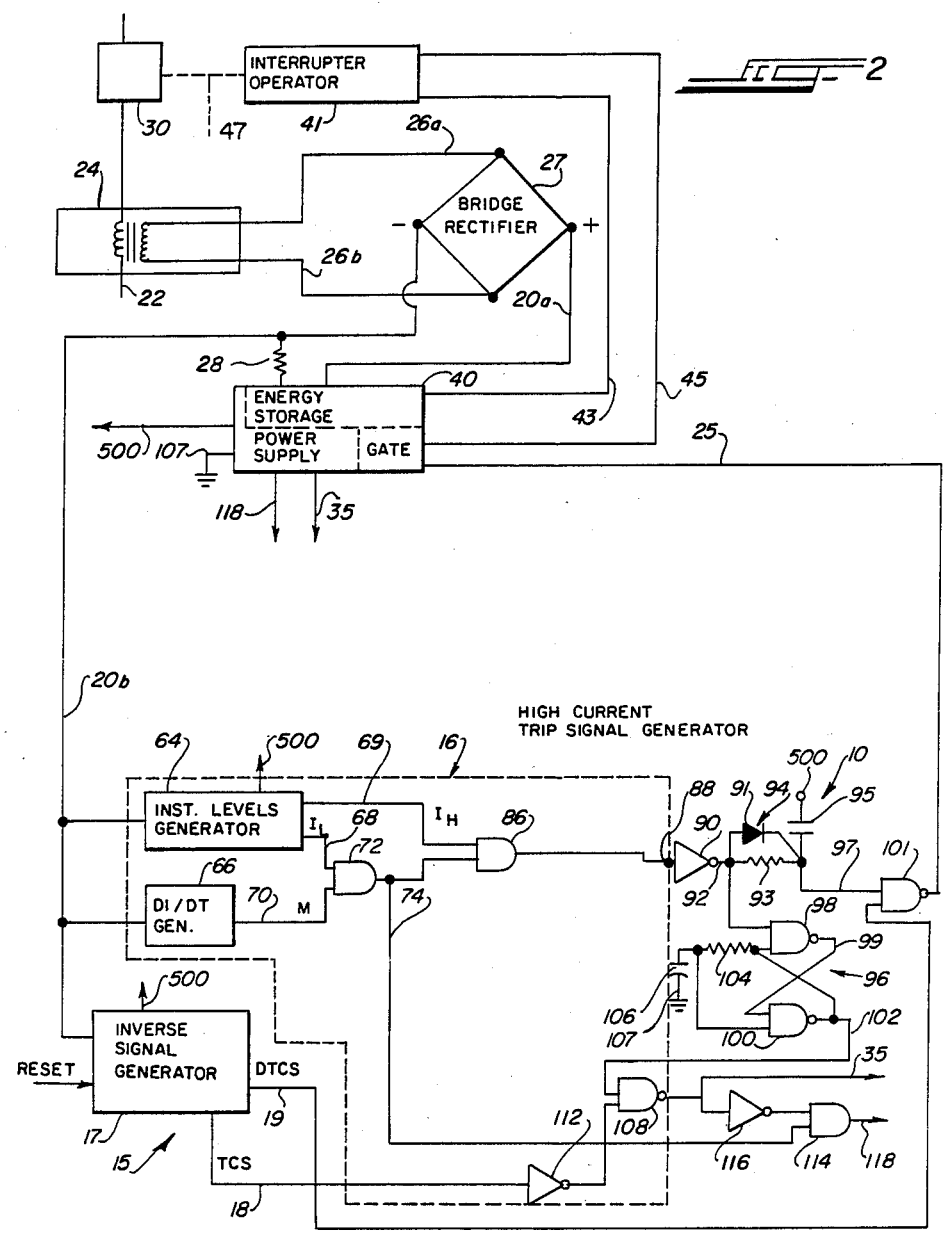

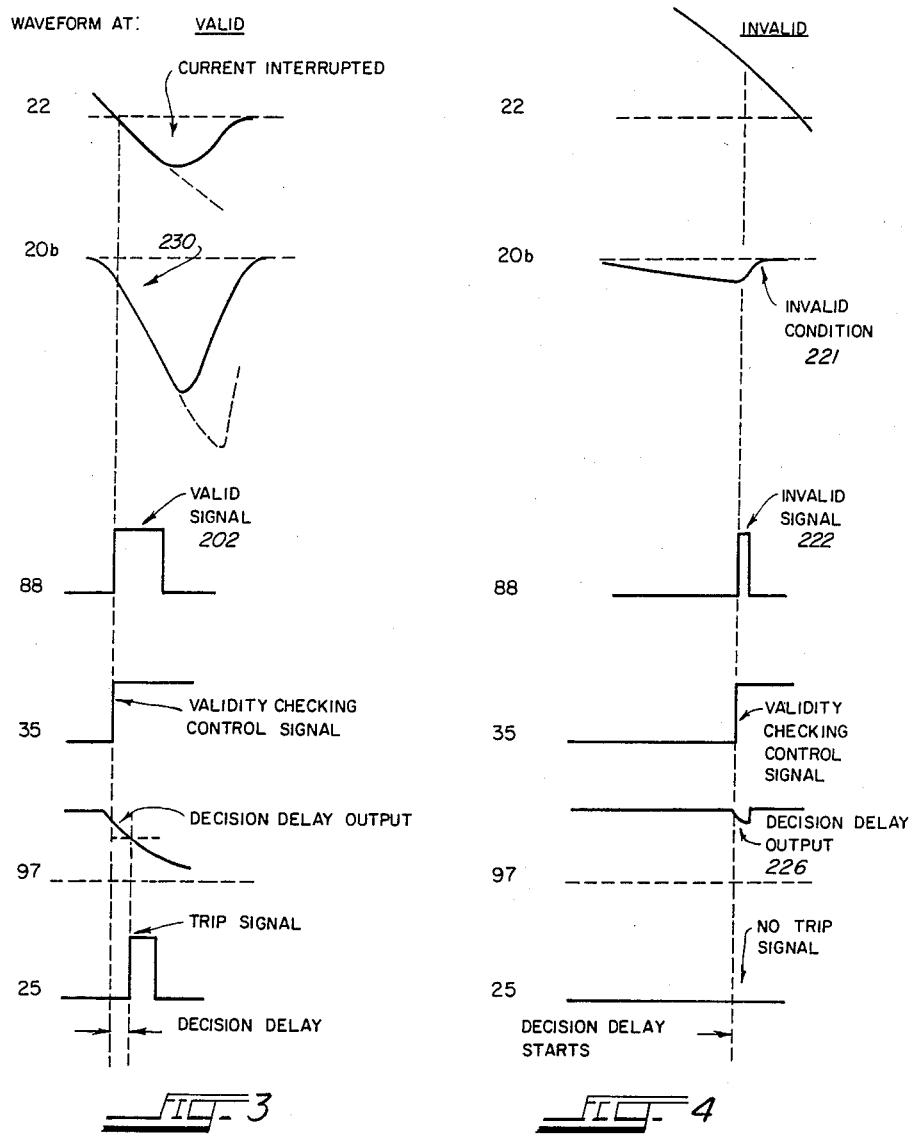

CONTROL CIRCUIT WITH VALIDITY-DETERMINING ARRANGEMENT

BACKGROUND OF THE INVENTION

1. Field of the Invention

The present invention relates generally to a method and an arrangement for detecting overcurrent conditions and more specifically to a control circuit including provisions to determine the validity of a sensed-current signal before issuing a trip signal to interrupt the current.

2. Description of the Related Art

Various control circuits are known which are responsive to the current in an AC line for detecting the presence of overcurrent conditions. For example, see U.S. Pat. Nos. 4,605,982, 4,571,658, 4,567,540, 4,642,724, 4,104,691, and 4,002,950, as well as U.S. application Ser. Nos. 791,195, 791,199 and 905,891 filed in the name of J. W. Ruta. While a current-sensing transformer is utilized in these control circuits to provide an accurate representation of instantaneous current for a portion of each half-cycle of current after zero crossing, the current is not accurately represented after the current-sensing transformer saturates. Additionally, various current-sensing arrangements are disclosed in U.S. Pat. Nos. 4,434,415, 4,297,741, and 4,532,571 and in a publication entitled "Digital EHV Current Transducer" by L. B. Berkebile, 1980, IEEE, 80 SM 647-8.

The control circuit in U.S. Pat. No. 4,685,024 utilizes a digital processor for performing RMS sampling of circuit current for comparison to stored long-time and short-time current values and corresponding time delays before tripping a breaker. A magnetic-core transformer is employed for providing an analog sensed-current signal to the digital processor. A core saturation signal is generated when the sensed current exceeds 10 times the rated circuit current since that is the current at which the current transformer is known to begin to saturate. When the core saturation signal is provided, the digital processor utilizes the largest possible current for the overcurrent determination rather than the actual current.

Where iron-core transformers or other magnetized-core transformers are utilized to sense the current, saturation can occur at the higher current levels which causes the sensed-current signal to be inaccurate. Of course, such inaccurate sensed-current signals can cause the generation of false trip signals; i.e., the generation of a trip signal to interrupt current when in fact the actual current is not at the level at which the tripping mode is desired. In many applications, it is impractical to provide a transformer with a large enough magnetic core to produce accurate sensed-current signals for the higher currents at which overcurrent detection takes place.

Thus, while these arrangements recognize the problem of obtaining an accurate representation of the sensed current, these arrangements neither provide a suitable instantaneous sensed-current signal nor determine the validity of a sensed-current signal before a decision is made to generate a trip signal and interrupt the current.

SUMMARY OF THE INVENTION

Accordingly, it is a principal object of the present invention to provide an arrangement for determining the validity of a sensed-current signal.

It is another object of the present invention to provide a control circuit that is responsive to signals provided by a current-sensing device for generating a control signal when overcurrent conditions are indicated; the control circuit validating the signal provided by the current-sensing device before generating the control signal.

It is another object of the present invention to provide an arrangement for modifying the circuit connected to a current-sensing transformer to detect whether or not the current-sensing transformer is generating valid sensed-current signals.

These and other objects of the present invention are efficiently achieved by an arrangement for checking the validity of a sensed-current signal from a current-sensing device. The sensed-current signal represents the current in a line. An associated control circuit utilizes the sensedcurrent signal to indicate or predict the presence of undesired overcurrent conditions. When such conditions may be present, the sensed-current signal is checked to determine if the sensed-current signal is valid; i.e., whether the sensed-current signal accurately represents the current in the line. If the sensed-current signal is invalid, no trip signal is generated to interrupt the current. If the sensed-current signal is valid, the control circuit generates a trip signal to control operation of a circuit-interrupting device.

In a particular arrangement, the load on the current-sensing device is changed to determine if the sensed-current signal is valid. If the sensedcurrent signal is valid, the level of the sensed-current signal remains in a valid range and the overcurrent-detection circuit issues the trip signal. If the sensed-current signal is invalid, the level of the sensed-current signal changes. In response, the control circuit does not issue the trip signal and is reset to an initialized mode to monitor for a valid overcurrent condition in response to the sensed-current signal.

In a specific arrangement, the current-sensing device is an iron-core transformer which saturates at high current levels.

BRIEF DESCRIPTION OF THE DRAWING

The invention, both as to its organization and method of operation, together with further objects and advantages thereof, will best be understood by reference to the accompanying drawing in which:

FIG. 2 is a detailed block and schematic diagram of the validitychecking arrangement and control circuit of FIG. 1;

FIGS. 3 and 4 are diagrammatic representations of various waveforms occurring in the arrangement of FIG. 2.

DETAILED DESCRIPTION

Figure 1:
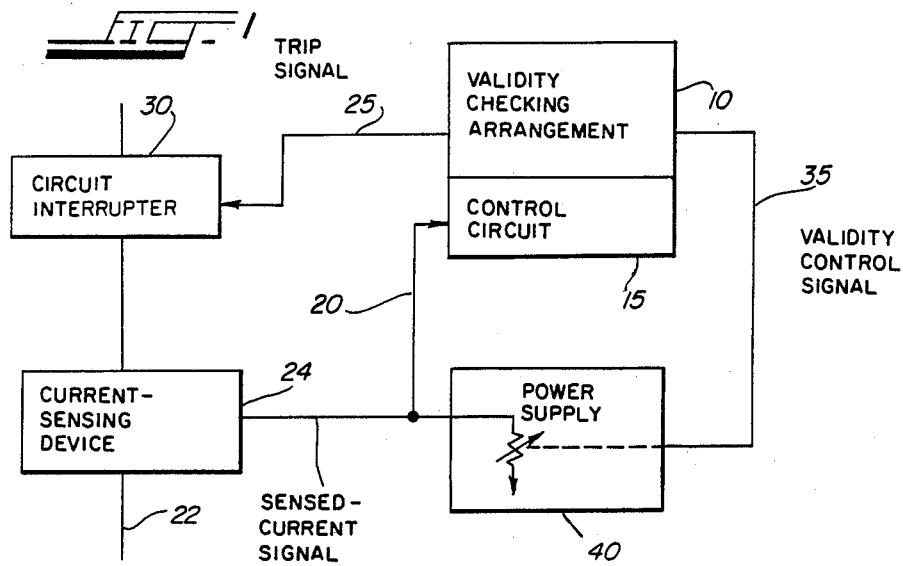
FIG. 1 is a block diagram representation of the validity-checking arrangement of the present invention with a control circuit that controls operation of a circuit interrupter.
Figure 5:
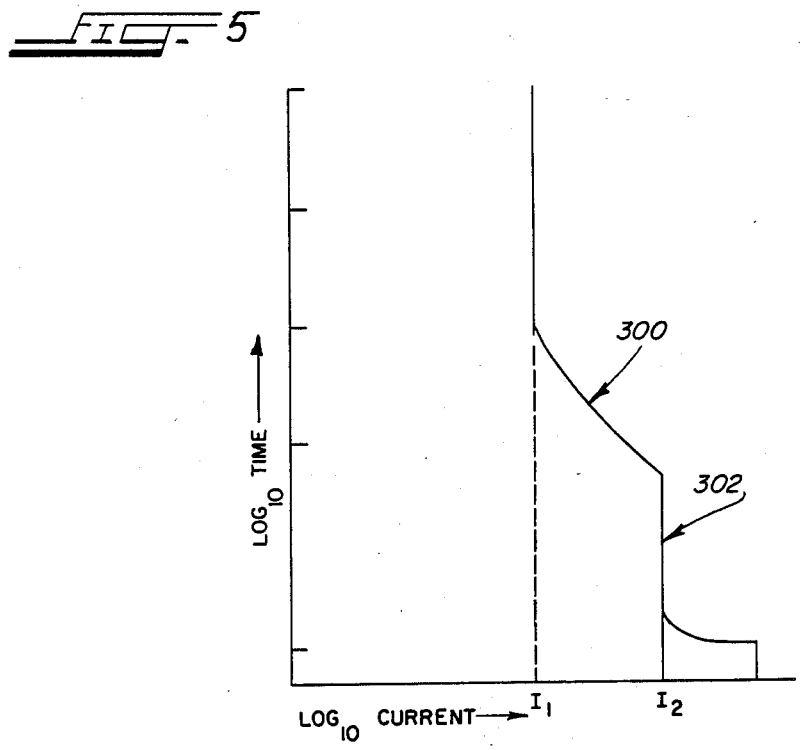
FIG. 5 is a diagrammatic representation of a specific time-current characteristic which exemplifies operation of the control circuit of FIG. 2.

Referring now to FIG. 1, the arrangement of the present invention for checking the validity of a sensed-current signal is illustrated in connection with a control circuit 15. The control circuit 15 in response to a sensed-current signal 20 detects the presence of overcurrent conditions in the line 22. When predetermined current relationships are detected, the control circuit indicates or predicts the onset of overcurrent conditions. In a specific arrangement, the predetermined current relationships include the instantaneous magnitude of the current and the rate of change of the current. When such overcurrent conditions are detected, the control circuit 15 generates a trip signal at 25 to initiate operation of a circuit interrupter 30 which in turn interrupts the flow of current in the line 22.

The sensed-current signal 20 is provided by a current-sensing device 24. Under certain conditions (which will be explained in more detail hereinafter for specific current-sensing devices), the sensed-current signal 20 may not accurately represent the current in the line 22 due to the characteristics of the current-sensing device 24. Accordingly, the control circuit 15 may indicate a trip condition when, in fact, there only appears to be a trip condition due to the inaccurate status of the sensed-current signal 20. The inaccuracy of the sensed-current signal 20 thus renders it invalid.

In accordance with important aspects of the present invention, a validity-checking arrangement 10 is provided. When the control circuit 15 detects the presence of overcurrent conditions in response to the sensed-current signal 20, the validity-checking arrangement 10 is operative to cause the validity of the sensed-current signal 20 to be verified. For example, in one specific illustration as shown in FIG. 1, the validity-checking arrangement 10 changes the load on the current-sensing device 24. If the current-sensing device 24 is operating in an inaccurate mode, the sensed-current signal at 20 will change in response to the varying load. This change can either be detected or will automatically establish that the sensed-current signal 20 is not valid. Accordingly, with this information, the control circuit 15 does not issue the trip signal at 25 and the current is not interrupted since the original detection of the overcurrent condition was a false indication. On the other hand, if the sensed-current signal at 20 remains valid after the load is changed via the validity-checking arrangement 10, the control circuit 15 proceeds to issue the trip signal at 25.

In the specific illustration of FIG. 1, the load on the current-sensing device 24 is changed by means of the validity-checking arrangement 10 controlling a power supply 40 via signal path 35 to modify the load seen by the current-sensing device 24. In a specific embodiment, the current-sensing device 24 supplies operating power to the control circuit 15 via the power supply 40, as well as providing the current-sensing signal 20. As will be explained in more detail hereinafter, the power supply 40 includes regulation features which are controlled via the signal path 35 to effectively vary the load as desired.

The current-sensing device 24 in a specific embodiment is an iron-core transformer which saturates at high current levels, such that the instantaneous sensed-current signal at 20 is inaccurate. While the term "iron-core transformer" is utilized, it should be understood that this term also applies to any other magnetized or magnetizeable current-sensing device. In any case, when the control circuit 15 detects an overcurrent condition, the changing of the load on the iron-core transformer causes a change in the sensed-current signal 20 if the saturation effects are causing the signal to be inaccurate.

Referring now to FIG. 2, a specific embodiment of the validity-checking arrangement 10 is illustrated along with a specific illustrative control circuit 15. While the detailed operation of a specific embodiment of the validity-checking arrangement 10 will be discussed in connection with the specific illustrative control circuit 15, it should be realized that the present invention is applicable to various other control circuits or the like.

The output 26a, 26b of the current-sensing device 24 is connected to a bridge rectifier 27. The bridge rectifier 27 outputs the sensed-current signal 20 on signal lines 20a, 20b. As shown in the specific illustration of FIG. 2, the sensed-current signal line 20a is connected to the power supply 40 to provide operating power to the power supply 40. The current flowing through signal line 20a represents the sensed current and flows through the power supply 40 and is returned via a resistor 28 to the signal line 20b and the return side of the bridge rectifier 27. Accordingly, the signal on line 20b is a voltage that is developed across the resistor 28 and that represents the sensed current in the alternating-current line 22 (except to the extent that any inaccuracy is introduced by the current-sensing device 24) on an instantaneous basis.

The control circuit 15 includes a high-current trip signal generator 16. The high-current trip signal generator 16 responds to the sensed-current signal on line 20b and detects the presence of overcurrents in the alternating current line 22 when predetermined current parameters satisfy a predetermined relationship or criteria. In the specific embodiment in FIG. 2, overcurrent conditions are detected on the basis of the instantaneous current exceeding a first value $I_L$ and the rate of change of the current (di/dt) exceeding a predetermined rate designated M. To this end, the high-current trip signal generator 16 includes a rate-of-change generator 66 and an instantaneous levels generator 64.

The rate-of-change generator 66 generates a signal at 70 when the rate of change of the current exceeds the predetermined rate. The instantaneous levels generator 64 generates a signal at 68 when the instantaneous current exceeds the first level $I_L$ and also generates a signal at 69 when the instantaneous current is below a second level $I_H$. The $I_L$ signal at 68 and the rate signal M at 70 are connected as inputs to an AND gate 72. The $I_H$ signal at 69 and the output 74 of the gate 72 (which represents the simultaneous presence of the $I_L$ and the M signals) are connected to respective inputs of a 2-input AND gate 86.

When the rate of change of the current exceeds the predetermined rate M and the current is between the first and second levels $I_L$ and $I_H$, the output 8B of the gate 86 is a high level which corresponds to the detection by the high-current trip signal generator 16 of an overcurrent condition. This corresponds, for example, to a control signal 202 at 88 in FIG. 3. A valid control signal at 88 occurs once during each half cycle of the alternating current waveform, assuming overcurrent detection conditions are met. The output 88 is connected through an inverter gate 90 to the validity-checking arrangement 10. Specifically, the output 92 of the inverter gate 90 is connected to the input of a decision-delay circuit 94 and a latch circuit 96. When the overcurrent condition is detected at 88, the output 92 of the inverter gate 90 goes low; i.e., a falling-edge signal.

The decision-delay circuit 94 provides a predetermined decision-delay time interval when the inverted output 92 goes low signifying overcurrent detection. During the duration of the decision-delay time interval, the validity of the sensed-current signal 20 is checked so that the trip signal 25 is not generated if the sensed-current signal 20 is invalid. After the predetermined decision delay, if the inverted output 92 has remained at a low level throughout the decision-delay interval, the decision-delay circuit at output 97 provides a low signal to one input of a 2-input NAND gate 101. The output 25 of the NAND gate 101 provides a trip signal. The decision-delay circuit 94 includes a diode 91 having an anode connected to the output 92 and a cathode connected to provide the output 97 to the gate 101. A resistor 93 is connected across the diode 91. A capacitor 95 is connected to the positive output 500 of the power supply 40. It should be noted that when the output 92 switches from a low level to a high level, the decision-delay circuit 94 is immediately set to provide a high output at 97 without the decision-delay time interval.

The latch 96 is arranged as a one-shot multivibrator and includes two 2-input NAND gates 98 and 100. When the output 92 goes low, the latch 96 is set with the output 99 of the gate 98 going to a high level and the output 102 of the gate 100 going to a low level. The output 92 is connected to one input of the NAND gate 98. The output 99 is connected to one input of the gate 100. The output 102 of the gate 100 is connected to the second input of the gate 98. Also connected to the output 102 of the gate 100 is a reset circuit including a resistor 104 in series with a capacitor 106. The junction of the resistor 104 and the capacitor 106 is connected to the second input of the gate 100. The other end of the capacitor 106 is connected to a circuit ground potential at 107.

Accordingly, when the overcurrent condition is detected, the inverted output 102 of the latch 96 goes to a low level. The output 102 is connected to one input of a 2-input NAND gate 108. The output of the NAND gate 108 provides the validity-checking control signal 35. Specifically, the validity-control signal at 35 is a high level when the inverted output 102 of the latch 96 is set to a low level.

In response to the validity-control signal at 35, the power supply 40 changes the load on the sensed-current signal 20a,20b. Specifically, the power supply 40 is conditioned to a high energy-storage mode to develop a high voltage level. The power supply in a specific embodiment is a shunt regulator of the type disclosed in U.S. Pat. No. 4,567,540. Accordingly, the shunt regulator device (not shown) is turned off to allow the higher voltage to be developed and the load on the current-sensing device 24 is reduced; i.e., load impedance is increased.

If the current-sensing device 24 is an iron-core transformer that is saturated, the increased voltage demand causes the sensed-current output at 20a,20b to drop. As those skilled in the art will realize, a linear current transformer functions as a current source to provide a secondary current that is proportional to the primary current regardless of the load on the secondary of the transformer. However, the secondary current provided by a saturated transformer depends on the secondary load. Thus, if the load on the transformer can be changed with no accompanying change in output current, the transformer is characterized as operating in a linear mode. In the case of an iron-core transformer being utilized for the current-sensing device 24, if the current-sensing device 24 is saturated, when the load impedance at 20a,20b is increased, the output at 20a,20b will drop.

When the overcurrent detection signal 202 (FIG. 3) is generated at 88 and the validity-control signal at 35 becomes active to change the load on the current-sensing device 24, if the current-sensing signal is valid, then the signals at 68 and 70 will remain valid throughout the decision delay—as depicted by the valid control signal 202 in the waveform at 88 in FIG. 3. It should also be noted that at the point 230 of the sensed-current signal at 20b, the signal remains valid and does not change when the validity-control signal at 35 is generated. Accordingly, when the decision-delay interval ends, the trip signal will be generated at 25, as shown in FIG. 3. The duration of the decision delay of circuit 94 is selected so that ample time is provided within which to check the validity of the sensed-current signal 20 before the trip signal at 25 is generated. A decision delay of approximately 100 microseconds has been found suitable without unduly delaying generation of the trip signal when a valid overcurrent situation exists. (In this regard, the waveforms at 97 and 25 in FIGS. 3 and 4 are not to scale and are expanded for clarity to depict the decision delay.)

On the other hand and referring now to FIG. 4, if the control circuit 15 detects an overcurrent condition when the current-sensing device 24 is saturated, for example, at 221 in the waveform at 20b in FIG. 4, the sensed-current output 20b will drop upon generation of the validity-control signal at 35. In response, the signal $I_L$ at 68 and/or the signal M at 70 will drop below the predetermined values and the signal 222 at 88 will go to a low level as shown in FIG. 4. In response to the low level at 88, the decision-delay circuit 94 at 97 is reset as shown at 226 in FIG. 4 during the decision-delay time interval, such that the trip signal at 25 is not generated. Therefore, the current is not interrupted since the overcurrent condition was not valid due to the inaccurate sensed-current signal at 20.

The trip signal 25 via a gate circuit in the power supply 40 then actuates the interrupter operator 41 over lines 43,45. The interrupter operator 41, as indicated by the dashed line 47 (FIG. 2), controls operation of the circuit interrupter 30 to interrupt the current in the line 22.

In the specific embodiment illustrated in FIG. 2, the control circuit includes an inverse trip signal generator 17 which is also responsive to the sensed-current signal at 20b. For example, the inverse trip signal generator 17 operates to detect lower-range overcurrent conditions. Referring additionally to FIG. 4, the exemplary time-current characteristic includes an inverse-time portion 300 provided by the inverse trip signal generator 17 and a high current or instantaneous portion 302 provided by the high-current trip signal generator 16. Of course, it should be understood that the present invention may be practiced utilizing control circuits with or without the inverse trip signal generator 17.

In any case, the accuracy of the sensed-current signal 20 is typically not a problem for the inverse trip signal generator 17 because the current levels for its operation are generally lower and below the range where saturation of an iron-core transformer causes inaccurate sensed-current signals; i.e., the current-sensing device 24 is chosen and fabricated such that for RMS currents below $I_2$ in FIG. 4, saturation effects are not a problem. However, the validity-checking arrangement 10 can also be utilized in specific embodiments with control circuits having high current-range inverse characteristics utilizing instantaneous current level detection, such as disclosed in U.S. application Ser. No. 791,195.

When the inverse trip signal generator 17 receives the sensed-current signal at 20b representing overcurrent conditions exceeding the RMS current $I_1$ in FIG. 4, a signal TCS at 18 is generated after the passage of a time period inversely related to the difference between the overcurrent and a threshold current level. The TCS signal at 18 is connected through an inverter gate 112 to the second input of the NAND gate 108. When the TCS signal at 18 is a high level, as it is after detecting an overcurrent condition, the validity-control signal at 35 is utilized to condition the power supply 40 to a high energy storage mode. This is done before the inverse trip signal generator 17 generates a delayed signal DTCS at 19 which is connected to the gate 101 to provide a trip signal at 25. In this manner, the power supply 40 is provided with a time interval in which to increase the stored energy to allow appropriate operation of the interrupter operator 41. When the high-current trip signal generates a trip signal at 25, the available current is high enough to, permit operation of the interrupter operator 30 directly from the combined current provided by the current-sensing device 24 and the energy stored in the power supply 40. However, for the lower currents, where the inverse-trip signal generator 17 is operative, the available energy may be insufficient. Thus, during the time interval between the generation of the signals TCS and DTCS, the power supply 40 is conditioned to the high energy-storage mode.

In accordance with other features of the present invention, the signal 74 from the gate 72 is connected to one input of a 2-input AND gate 114. The second input of the AND gate 114 is connected to the output of an inverter gate 116 having an input connected to the validity-control signal 35. Thus, the output 118 of the gate 114 is a high level only when the high energy-storage mode of the power supply 40 is not being required, but the $I_L$ and M signals are active indicating the presence of high overcurrent conditions. The output 118 is utilized to condition the power supply 40 to an intermediate energy-storage mode. This provides for increased storage during the time the high-current trip signal generator 16 may be detecting an overcurrent condition, while the current-sensing device is providing relatively low current to operate the power supply 40 and the remainder of the control circuit 15. This ensures adequate operating power for the control circuit 15. The difference in the operating voltage levels of the power supply 40 between the intermediate level conditioned by the signal 118 and the high level conditioned by the signal 35 is arranged to be sufficient such that when increasing from the intermediate mode to the high level mode (such as when the validity of the sensed-current signal is being checked), the power supply will present a proper change in load to the current-sensing device 24.

While there have been illustrated and described various embodiments of the present invention, it will be apparent that various changes and modifications will occur to those skilled in the art.

What is claimed and desired to be secured by Letters Patent of the United States is:

1. A control circuit for generating a trip signal in the presence of overcurrent conditions, the control circuit being responsive to a sensed-current signal that represents the current in a line, the control circuit comprising:
   means responsive to the sensed-current signal for detecting the presence of overcurrent conditions; and
   means responsive to said detecting means for generating a trip signal, said trip-signal generating means comprising validity-checking means for determining that said sensed-current signal accurately represents the current in the line before generating said trip signal, said validity-checking means comprising means for changing the load presented to the sensed-current signal.

2. The control circuit of claim 1 wherein said detecting means generates a control signal only during the time when predetermined current parameters are satisfied in said sensed-current signal.

3. The control circuit of claim 2 wherein said validity-checking means further comprises means for generating said trip signal if said control signal is being generated after the load presented to the sensed-current signal has been changed.

4. A control circuit for generating a trip signal when overcurrent conditions are present in an alternating-current line comprising:
   magnetizable means responsive to the current in the line for providing a sensed-current signal;
   means responsive to said sensed-current signal for generating a first signal in the presence of overcurrent conditions;
   means responsive to said first signal for determining whether or not said sensed-current signal is an accurate representation of the current in the line by determining whether said magnetizable means is saturated; and
   means responsive to said determining means for generating a trip signal only when said magnetizable means is not saturated.

5. A control circuit for detecting the presence of overcurrent conditions comprising:
   current-sensing means responsive to the current in a line for providing a sensed-current signal that represents the current in the line;
   means responsive to said sensed-current signal for detecting overcurrent conditions and for generating a control signal; and
   validity-checking means responsive to said control signal for determining whether or not said sensed current signal accurately represents the current in the line, said validity-checking means comprising means for changing the load on said current-sensing means.

6. The control circuit of claim 5 further comprising means responsive to said control signal for generating a trip signal when said sensed current signal is determined to accurately represent the current in the line.

7. The control circuit of claim 5 wherein said validity-checking means comprises means for generating a trip signal after a decision-delay interval if a control signal is present after the decision-delay interval.

8. The control circuit of claim 5 wherein said current-sensing means comprises a magnetizable device and said validity-checking means comprises means for determining whether said magnetizable device is saturated.

9. A method for detecting overcurrent conditions in response to a sensed-current signal that is derived from a magnetizable current-sensing device and that represents the current in a line, the method comprising the steps of determining whether or not predetermined instantaneous current parameters are satisfied on the basis of said sensed-current signal, establishing whether or not said sensed-current signal is an accurate representation of the current in the line after said predetermined instantaneous current parameters are satisfied by checking that the magnetizable current-sensing device is not saturated, and generating a decision signal on the basis of said establishing step only when the magnetizable current-sensing device is not saturated.

10. A control circuit for generating a trip signal in the presence of overcurrent conditions, the control circuit being responsive to a sensed current signal that is derived from a magnetizable device and that represents the current in a line, the control circuit comprising:
  means response to the sensed-current signal for detecting the presence of overcurrent conditions; and
  means responsive to said detecting means for generating a trip signal, said trip-signal generating means comprising validity-checking means for checking that the magnetizable device is not saturated before generating said trip signal.

11. A control circuit for detecting the presence of overcurrent conditions comprising:
  magnetizable current-sensing means responsive to the current in a line for providing a sensed-current signal that represents the current in the line;
  means responsive to said sensed-current signal for detecting overcurrent conditions and for generating a control signal; and
  validity-checking means responsive to said control signal for determine whether or not said sensed-current signal accurately represents the current in the line, said validity-checking means comprising means for checking that said magnetizable current-sensing means is not saturated.

* * * * *

UNITED STATES PATENT AND TRADEMARK OFFICE
CERTIFICATE OF CORRECTION

PATENT NO. : 4,839,770

DATED : June 13, 1989

INVENTOR(S) : Joseph W. Ruta

It is certified that error appears in the above-identified patent and that said Letters Patent is hereby corrected as shown below:

Col. 2, line 18, and col. 2, line 30, "sensedcurrent" should be
-- sensed-current -- (insert hyphen)

Col. 2, line 52 "validitychecking" should be -- validity-checking --
(insert hyphen)

Col. 4, line 49, "8B" should be -- 88 --

Col. 7, line 10, "energystorage" should be -- energy-storage --
(insert hyphen) .

Col. 9, line 8, claim 10, "sensed current" should be -- sensed-current --
(insert hyphen).

Signed and Sealed this

Tenth Day of April, 1990

Attest:

HARRY F. MANBECK, JR.

*Attesting Officer*  *Commissioner of Patents and Trademarks*